(12) United States Patent
Song et al.

(10) Patent No.: US 11,858,415 B2
(45) Date of Patent: Jan. 2, 2024

(54) LAMP FOR VEHICLE AND VEHICLE INCLUDING THE SAME

(71) Applicant: HYUNDAI MOBIS CO., LTD., Seoul (KR)

(72) Inventors: Ki Ryong Song, Yongin-si (KR); Seok Huyn Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 142 days.

(21) Appl. No.: 17/718,505

(22) Filed: Apr. 12, 2022

(65) Prior Publication Data

US 2022/0340077 A1 Oct. 27, 2022

(30) Foreign Application Priority Data

Apr. 21, 2021 (KR) ........................ 10-2021-0051898

(51) Int. Cl.
  *B60Q 3/50* (2017.01)
  *F21S 43/27* (2018.01)
  *F21S 43/237* (2018.01)
  *F21S 43/251* (2018.01)
  *G02B 6/36* (2006.01)
  *F21S 41/24* (2018.01)

(52) U.S. Cl.
  CPC .............. *B60Q 3/50* (2017.02); *F21S 43/237* (2018.01); *F21S 43/251* (2018.01); *F21S 43/27* (2018.01); *G02B 6/3628* (2013.01); *F21S 41/24* (2018.01)

(58) Field of Classification Search
  CPC ... B60Q 3/50; B60Q 3/62; B60Q 3/64; B60Q 3/66; G02B 6/3628; F21S 43/237; F21S 43/27; F21S 43/251; F21S 41/24; F21S 43/235
  USPC ........................................................ 362/511
  See application file for complete search history.

(56) References Cited

U.S. PATENT DOCUMENTS

| | | | | |
|---|---|---|---|---|
| 10,864,850 B1 * | 12/2020 | Sowles | .................... | B60Q 3/62 |
| 11,732,866 B2 * | 8/2023 | Song | ........................ | F21S 43/27 |
| | | | | 362/511 |
| 2022/0111791 A1 * | 4/2022 | Hori | ........................ | B60Q 3/54 |

* cited by examiner

*Primary Examiner* — Laura K Tso
(74) *Attorney, Agent, or Firm* — NovoTechIP International PLLC

(57) ABSTRACT

Disclosed are a lamp for a vehicle and a vehicle including the same. A lamp for a vehicle includes a lamp housing, a light source unit mounted on the lamp housing and that irradiates light, a bezel installed in the lamp housing, an optical fiber fixed to the bezel, coupled to the light source part, and that outputs the light irradiated from the light source part, and a tension unit provided in the bezel, and that applies a tension to the optical fiber in a state, in which the optical fiber is fixed to the bezel.

15 Claims, 11 Drawing Sheets

LAMP FOR VEHICLE AND VEHICLE INCLUDING THE SAME

CROSS-REFERENCE TO RELATED APPLICATIONS

This application claims the benefit of priority to Korean Patent Application No. 10-2021-0051898, filed in the Korean Intellectual Property Office on Apr. 21, 2021, the entire disclosure of which is incorporated herein by reference.

BACKGROUND

1. Technical Field

The present disclosure relates to a lamp for a vehicle and a vehicle including the same, and more particularly, to a lamp for a vehicle that stably fixes an optical fiber installed in an interior of the lamp, and a vehicle including the same.

2. Discussion of Related Art

In general, a vehicle is equipped with various kinds of lamps having a lighting function for allowing a user to easily identify an object located around a vehicle during nighttime driving and a signal function for informing other vehicles or road users of a driving state of the vehicle. In recent years, an importance of lamps in an aspect of design as well as an aspect of functions of the lamps has increased, and lamps that enhance a degree of freedom of design have been developed by using optical fibers.

The optical fibers for lighting may be classified into an end emitting optical fiber that emits light from an end thereof, and a side emitting optical fiber that emits light from a side thereof. The end emitting optical fiber may be easily fixed because only an end cross-section thereof is exposed and an intermediate portion thereof is not exposed, and it is difficult to fix the side emitting optical fiber with a general fixing structure that fixes the end emitting optical fiber because it emits light from a side surface thereof as well as opposite ends thereof and thus most of the areas of the optical fiber are exposed.

When the side emitting optical fiber is fixed with a conventional fixing structure of the end emitting optical fiber, the optical fiber may be prolonged or separated when the vehicle is assembled or vibrates due to properties of the optical fiber, and thus a product value of the lamp for a vehicle may deteriorate. Accordingly, it is necessary to improve a structure, in which the side emitting optical fiber may be stably installed when it is applied to the vehicle.

SUMMARY

The present disclosure has been made to solve the above-mentioned problems occurring in the prior art while advantages achieved by the prior art are maintained intact.

An aspect of the present disclosure provides a lamp for a vehicle, in which a side emitting optical fiber may be fixed while being tensioned by using a tension unit when the side emitting optical fiber is installed, and a vehicle including the same.

Another aspect of the present disclosure provides a lamp for a vehicle that enhances a product value by minimizing prolongation of an optical fiber due to assembling or vibration of a vehicle even when the optical fiber is a side emitting optical fiber.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lamp for a vehicle includes a lamp housing, a light source unit mounted on the lamp housing and that irradiates light, a bezel installed in the lamp housing, an optical fiber fixed to the bezel, connected to the light source part, and that outputs the light irradiated from the light source part, and a tension unit provided in the bezel, and that applies a tension to the optical fiber in a state, in which the optical fiber is fixed to the bezel.

The optical fiber may extend from one side to an opposite side of the bezel, and one end of the optical fiber may be fixed to the one side of the bezel, and an opposite end of the optical fiber may be fixed to the opposite side of the bezel.

The one end of the optical fiber may be connected to the light source unit such that light is input to the optical fiber, and at least a portion of the light input from the light source unit to the one end of the optical fiber may be output to a side surface of the optical fiber.

The bezel may include a lower bezel having a first through-hole at an opposite side thereof such that the opposite end thereof passes therethrough, and an upper bezel coupled to the opposite side of the lower bezel, and having a second through-hole formed at a location corresponding to the first through-hole.

The tension unit may be provided in the upper bezel, includes an elastic material, and may press the opposite end of the optical fiber that passes through the first through-hole and the second through-hole in a downward direction that faces the lower bezel.

The tension unit may include a fixed portion fixed to the upper bezel, and a pressing portion extending from the fixed portion downward, and that presses the optical fiber.

The pressing portion may be formed to be inclined to become farther away from the upper bezel as it goes downwards.

The lamp may further include a first fixing part coupled to one side of the lower bezel, and that fixes the one end of the optical fiber to the one side of the lower bezel, and a second fixing part coupled to the opposite side of the lower bezel, and that fixes the opposite end of the optical fiber to the opposite side of the lower bezel, and the tension unit may press the optical fiber between a location, at which the optical fiber is fixed by the second fixing part, and the bezel.

The second fixing part may include a fixed bracket fixed to the lower bezel, and configured such that the opposite end of the optical fiber passes therethrough, and an insertion member coupled to the fixed bracket and that fixes the opposite end of the optical fiber, and the insertion member may be coupled to the fixed bracket to fix the optical fiber in a state, in which the optical fiber is inserted through the fixed bracket.

The fixed bracket may include a support body fixed to the lower bezel, a first fixing boss protruding from the support body in an upward direction that is a direction that faces the upper bezel, and having a first fixing recess, through which the optical fiber passes, and a second fixing boss protruding upwards from the support body, spaced apart from the first fixing boss, and having a second fixing recess, through which the optical fiber passes.

The fixed bracket may have an insertion space, into which the insertion member is inserted, between the first fixing boss and the second fixing boss, and the insertion member may include an insertion bracket hook-coupled to the fixed bracket, and a first insertion block coupled to the insertion bracket, and that presses the optical fiber located in the insertion space to fix the optical fiber when the insertion bracket and the fixed bracket are coupled to each other.

The first insertion block may include a rubber material.

The fixed bracket may have an insertion space, into which the insertion member is inserted, between the first fixing boss and the second fixing boss, and the insertion member may include a second insertion block coupled between the first fixing boss and the second fixing boss through interference-fitting, and that elastically presses the optical fiber located in the insertion space to fix the optical fiber.

The second insertion block may include a rubber material.

According to an aspect of the present disclosure, a vehicle includes a lamp, and the lamp includes a lamp housing, a light source unit coupled to the lamp housing and that irradiates light, a bezel installed in the lamp housing, an optical fiber fixed to the bezel, connected to the light source part, and that outputs the light irradiated from the light source part, and a tension unit provided in the bezel, and that applies a tension to the optical fiber in a state, in which the optical fiber is fixed to the bezel.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings.

First, the embodiments described herein are embodiments that are suitable for understanding the technical features of a lamp for a vehicle and a vehicle including the same according to the present disclosure. However, the present disclosure is not limited to the embodiment described below or the technical features of the present disclosure are not limited by the described embodiments, and the present disclosure may be variously modified without departing from the technical scope of the present disclosure.

Figure 1:
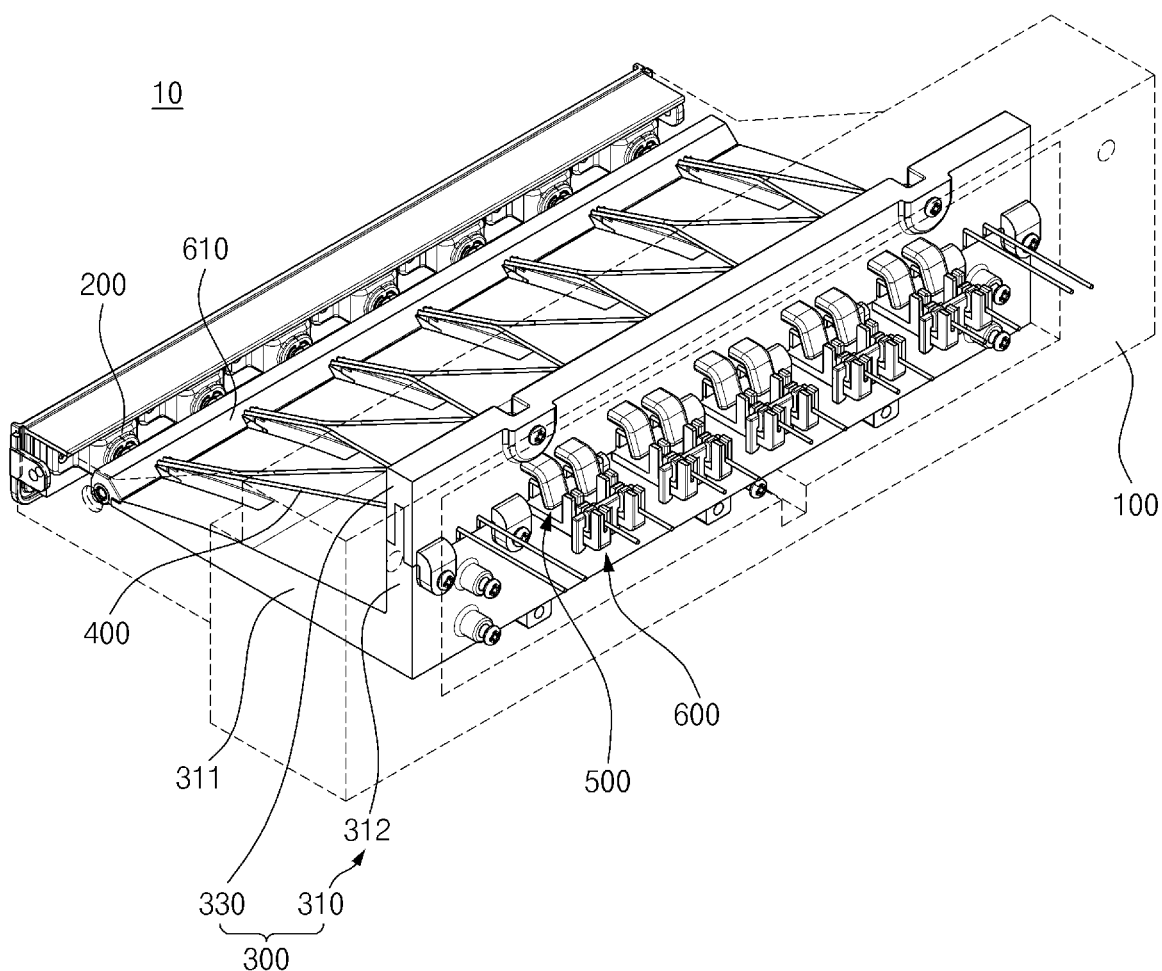
FIG. 1 is a perspective view illustrating a lamp for a vehicle according to an embodiment of the present disclosure.
Figure 2:
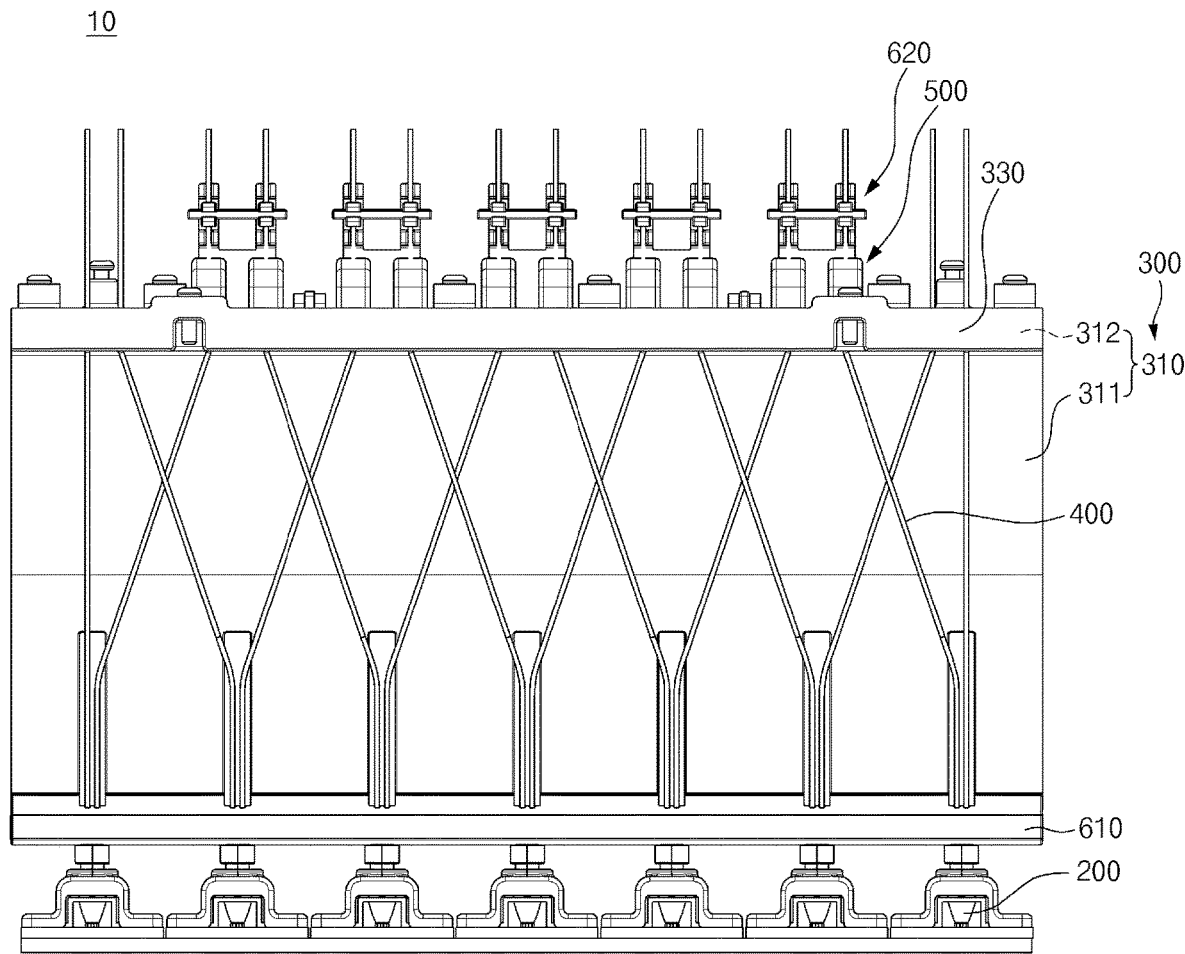
FIG. 2 is a top view illustrating a lamp for a vehicle according to an embodiment of the present disclosure, and is a view illustrating a state, in which a lamp housing of FIG. 1 is removed.
Figure 3:
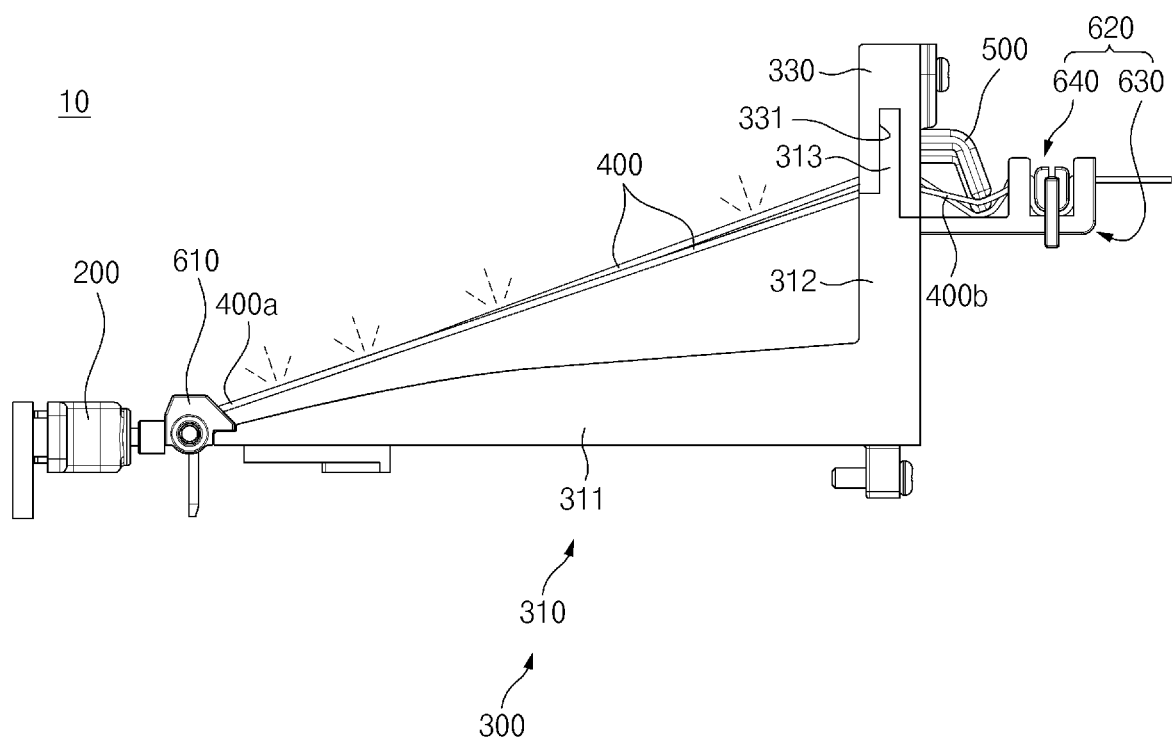
FIG. 3 is a front view illustrating a lamp for a vehicle according to an embodiment of the present disclosure, and is a view of FIG. 2, when viewed from a right side.
Figure 4:
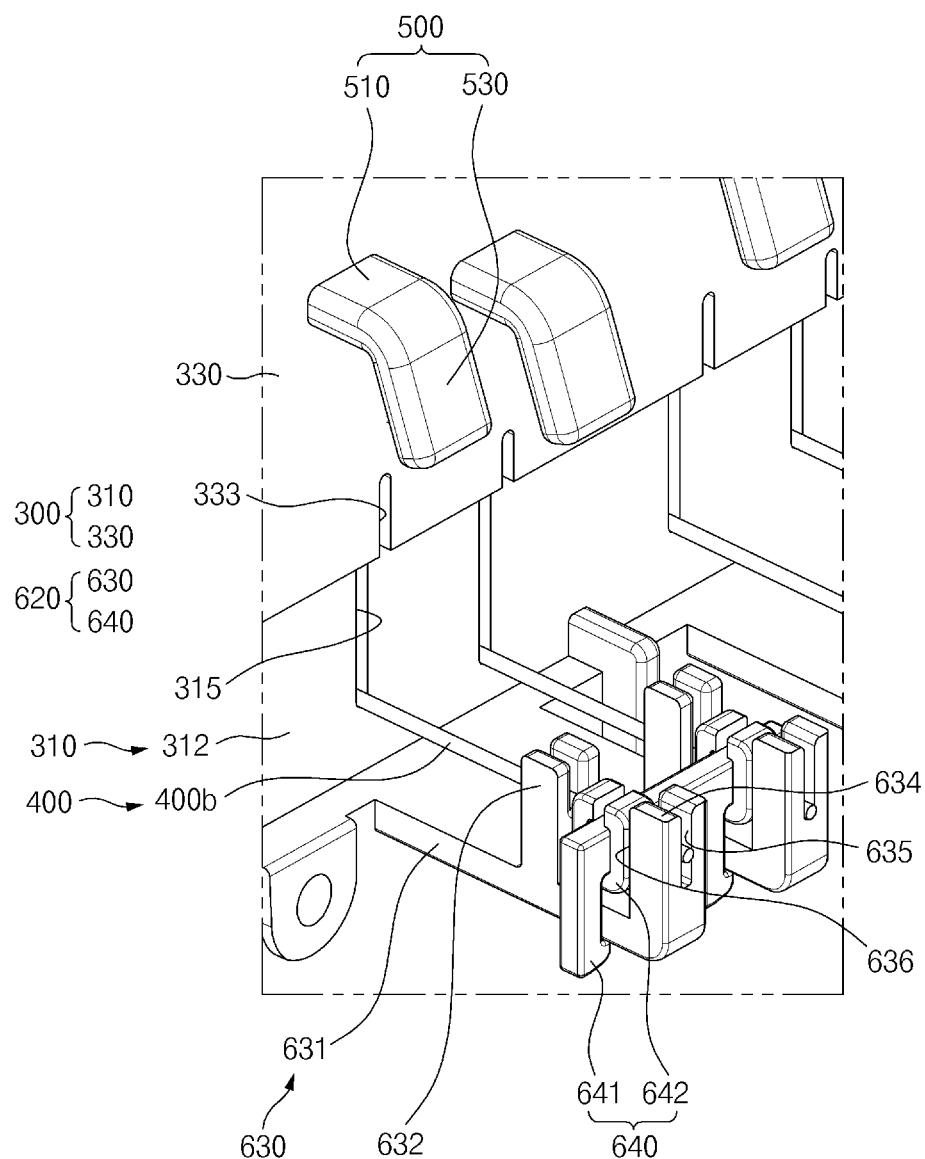
FIG. 4 is an enlarged perspective view illustrating a portion of a lamp for a vehicle according to an embodiment of the present disclosure, and is a view illustrating a state before an upper bezel and a lower bezel are assembled.
Figure 5:
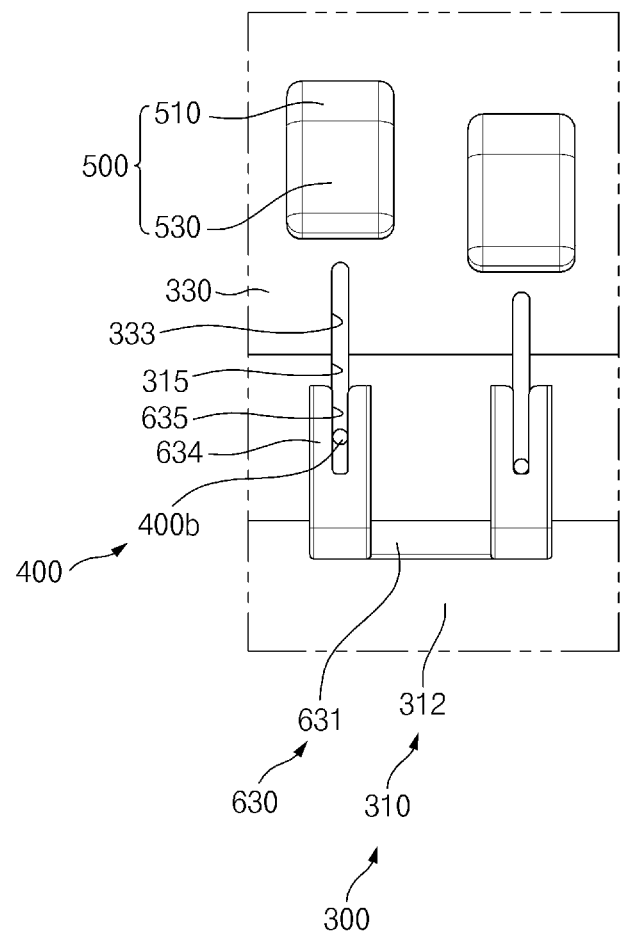
FIG. 5 is a side view of FIG. 4, when viewed from a lateral side.
Figure 6:
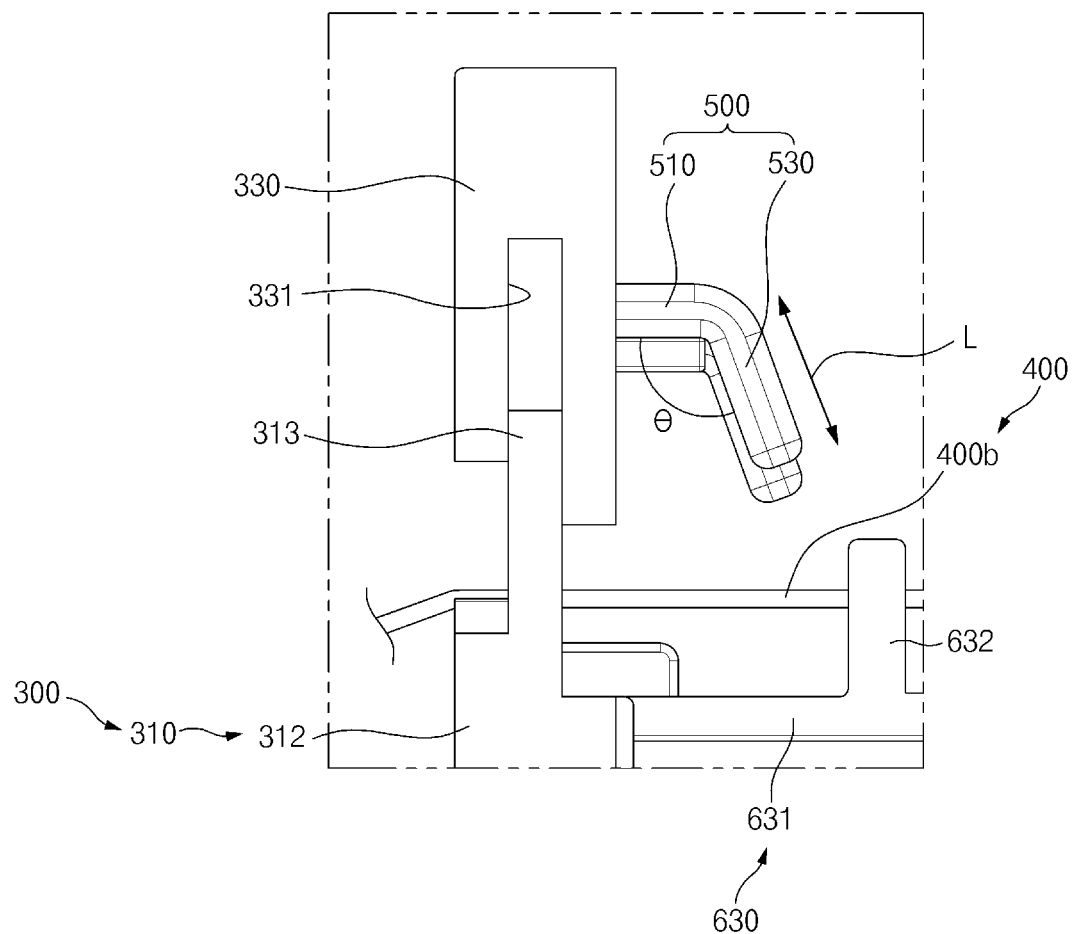
FIG. 6 is a front view of FIG. 4, when viewed from a front side.
Figure 7:
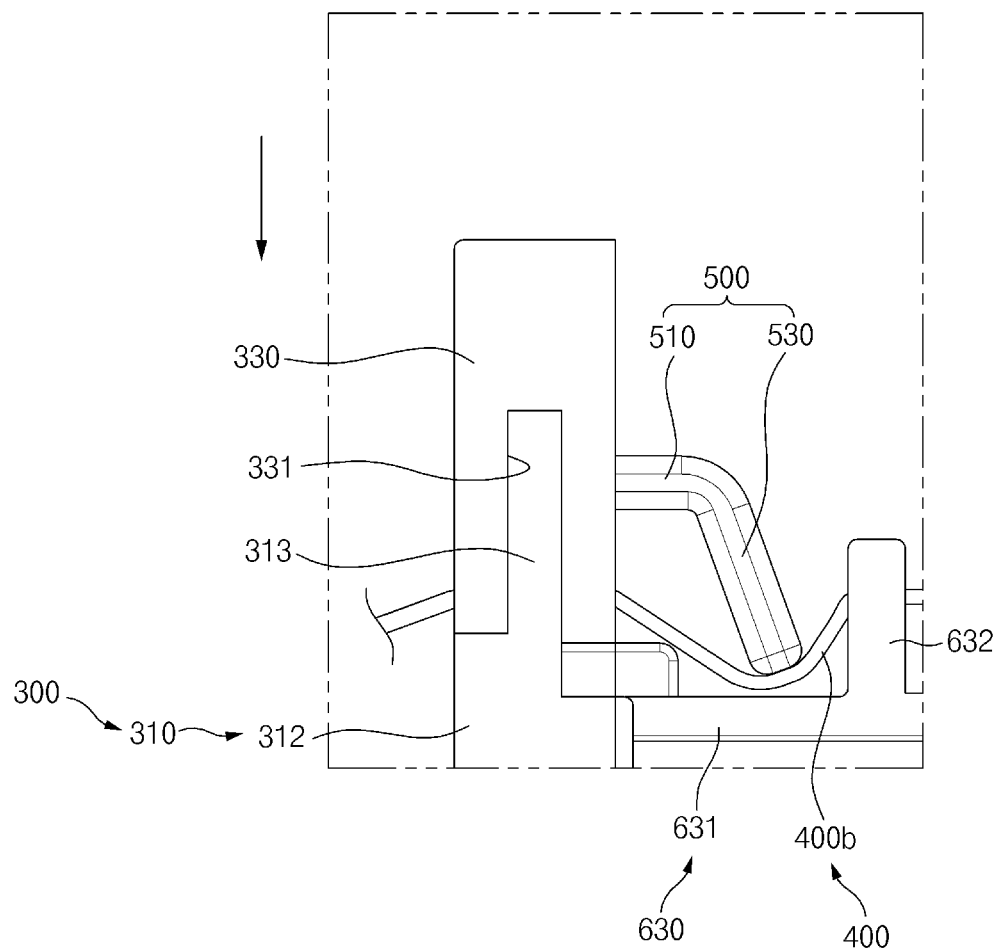
FIG. 7 is a view illustrating a state, in which an upper bezel and a lower bezel of FIG. 6 are assembled.

FIG. 1 is a perspective view illustrating a lamp for a vehicle according to an embodiment of the present disclosure. FIG. 2 is a top view illustrating the lamp for a vehicle according to an embodiment of the present disclosure, and is a view illustrating a state, in which a lamp housing of FIG. 1 is removed. FIG. 3 is a front view illustrating the lamp for a vehicle according to an embodiment of the present disclosure, and is a view of FIG. 2, when viewed from a right side. FIG. 4 is an enlarged perspective view illustrating a portion of the lamp for a vehicle according to an embodiment of the present disclosure, and is a view illustrating a state before an upper bezel and a lower bezel are assembled. FIG. 5 is a side view of FIG. 4, when viewed from a lateral side; FIG. 6 is a front view of FIG. 4, when viewed from a front side; FIG. 7 is a view illustrating a state, in which the upper bezel and the lower bezel of FIG. 6 are assembled.

Figure 8:
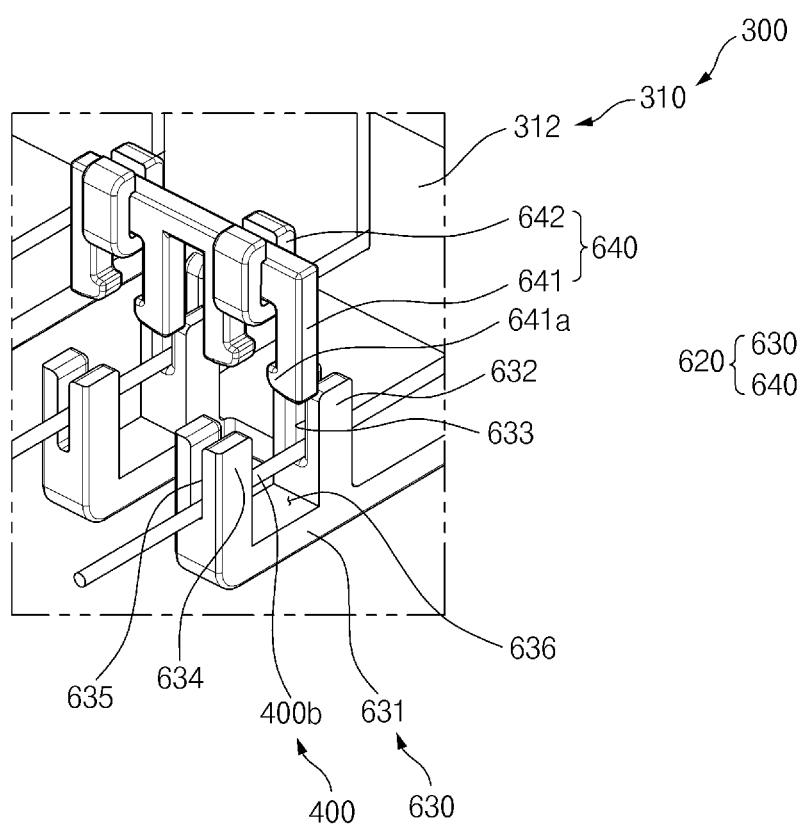
FIG. 8 is an enlarged perspective view illustrating a first embodiment of a second fixing part according to the present disclosure, and is a view illustrating a state before the second fixing part is assembled.
Figure 9:
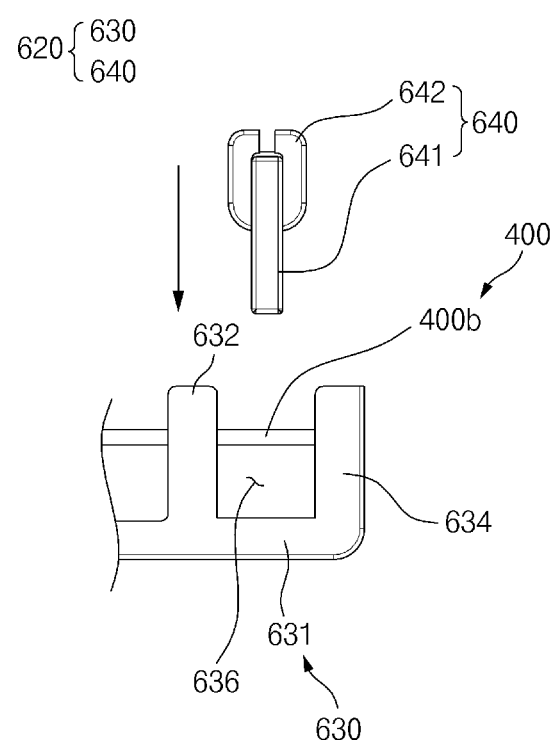
FIG. 9 is a front view illustrating a first embodiment of a second fixing part according to the present disclosure.
Figure 10:
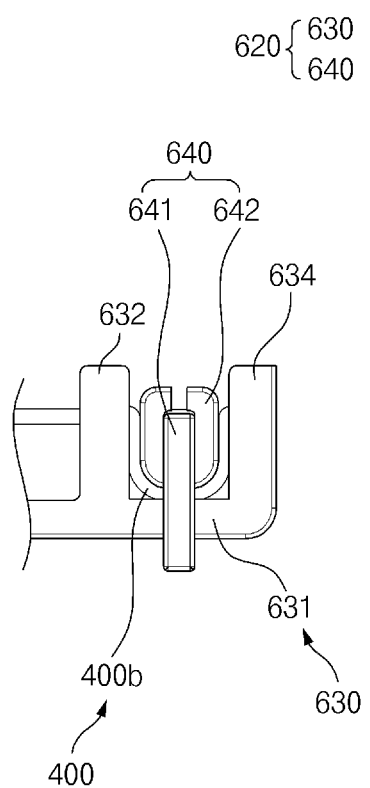
FIG. 10 is a view illustrating a state, in which a second fixing part of FIG. 9 is assembled.
Figure 11:
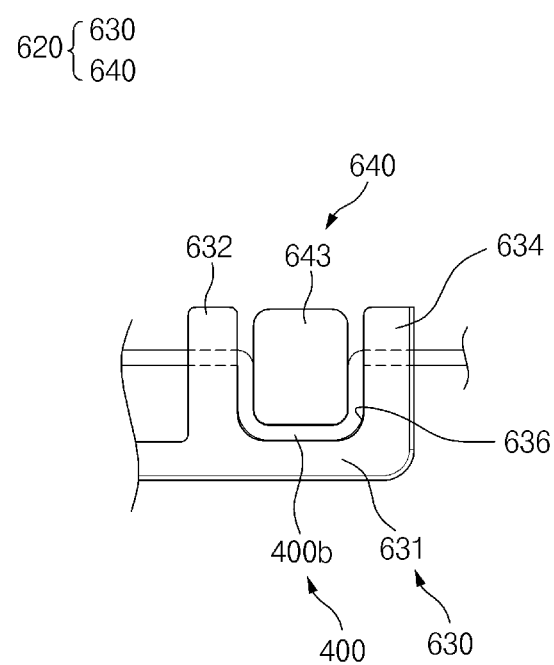
FIG. 11 is a front view illustrating a second embodiment of a second fixing part according to the present disclosure.

FIG. 8 is an enlarged perspective view illustrating a first embodiment of a second fixing part according to the present disclosure, and is a view illustrating a state before the second fixing part is assembled. FIG. 9 is a front view illustrating the first embodiment of the second fixing part according to the present disclosure. FIG. 10 is a view illustrating a state, in which the second fixing part of FIG. 9 is assembled. FIG. 11 is a front view illustrating the second embodiment of the second fixing part according to the present disclosure.

Referring to FIGS. 1 to 11, a lamp 10 for a vehicle according to an embodiment of the present disclosure includes a lamp housing 100, a light source unit 200, a bezel 300, an optical fiber 400, and a tension unit 500.

The lamp housing 100 constitutes a body of the lamp 10 for a vehicle, and an accommodation space that accommodates components of the lamp may be formed therein.

The light source unit 200 may be housed at or mounted on the lamp housing 100 and may be configured to irradiate light. For example, the light source unit 200 may include a board coupled to the lamp housing 100, and a light source housed at or mounted on the board. Here, the light source, for example, may be a light emitting diode or a laser, and the board may be a printed circuit board (PCB). One or a plurality of light source parts 200 may be provided in an interior of the lamp housing 100.

The bezel 300 may be coupled to the lamp housing 100. The bezel 300 may be formed to be inserted into the lamp housing 100, and may function to reinforce an overall strength of the lamp. Furthermore, the bezel 300 may be coupled to the interior of the lamp housing 100 to mount and protect the optical fiber 400, and may function to reflect light output from the light source unit 200 and the optical fiber 400.

The optical fiber 400 is coupled (or fixed) to the bezel 300, is connected to the light source unit 200, and is configured to output the light irradiated from the light source unit 200.

Here, one end 400a of the optical fiber 400 may be connected to the light source unit 200 such that the light is input from the light source. Furthermore, at least a portion of the light input from the light source unit 200 to the one end 400a of the optical fiber 400 may be output to a side surface of the optical fiber 400.

In detail, the optical fiber 400 may function to provide a path, along which the light output from the light source travels, and output the light. That is, the light input from the light source to the one end 400*a* of the optical fiber 400 may travel toward an opposite end 400*b* of the optical fiber 400, and a portion of the light may be output to the side surface of the optical fiber 400 in the process of traveling.

To achieve this, the optical fiber 400 may extend along a direction that is inclined such that it is located on an upper side as it becomes farther away from the light source unit 200. In FIG. 3, the optical fiber 400 may extend along a direction that is inclined to be located on an upper side as it goes to a right side. In this case, the light output from the light source unit 200 may be totally reflected on the interior of the optical fiber 400 after being input to the optical fiber 400, a portion of the light may pass through the optical fiber 400, and the light that passes through the optical fiber 400 may be output in a leftward direction of FIG. 3. Meanwhile, a known technology may be applied to the structure of the optical fiber 400.

A plurality of optical fibers 400 may be provided. In the illustrated example, the plurality of (for example, two) optical fibers 400 may be connected to the one light source unit 200. The number of the optical fibers 400 connected to the one light source unit 200 is not limited to the illustrated embodiment.

Furthermore, the optical fiber 400 may extend from one side to an opposite side of the bezel 300. Furthermore, the one end 400*a* of the optical fiber 400 may be coupled or fixed to the one side of the bezel 300, and the opposite end 400*b* of the optical fiber 400 may be fixed to the opposite side of the bezel 300. That is, opposite lengthwise ends of optical fiber 400 may be fixed to the bezel 300.

However, as described above, because the optical fiber 400 according to the present disclosure is configured such that light is output through the side surface of the optical fiber 400, most of the areas of the optical fibers 400 may not be supported by the other configurations but may be exposed to an outside, whereby the optical fiber 400 may be prolonged. Accordingly, a product value of the lamp for a vehicle may deteriorate. Accordingly, the present disclosure includes the tension unit 500 to solve the above problems, and thus may minimize prolongation of the optical fiber 400.

The tension unit 500 is provided in the bezel 300, and is configured to apply a tension to the optical fiber 400 in a state, in which the optical fiber 400 is fixed to the bezel 300.

In detail, the tension unit 500 may be integrally formed with or coupled to the bezel 300. Furthermore, the tension unit 500 may be configured to press a portion of the optical fiber 400 to apply a tension to the optical fiber 400 when the optical fiber 400 is fixed to the bezel 300. Then, the tension applied to the optical fiber 400 by the tension unit 500 may vary according to a shape, a size, and a mounting location of the tension unit 500. For example, the tension unit 500 may be formed of an elastic material to elastically press the optical fiber 400. However, the material of the tension unit 500 is not limited thereto.

In this way, the lamp 10 for a vehicle according to the embodiment of the present disclosure includes the tension unit 500 such that the optical fiber 400 is fixed while being tensioned. Accordingly, in the case of the side light emitting optical fiber 400, prolongation of the optical fiber 400 due to assembling or vibration of the vehicle may be minimized, and accordingly, the product value of the lamp 10 for a vehicle may be enhanced.

Referring to FIGS. 3 to 7, the bezel 300 may include a lower bezel 310 and an upper bezel 330.

The lower bezel 310 may have a first through-hole 315 configured such that the opposite end 400*b* of the optical fiber 400 passes therethrough, on an opposite side thereof. Furthermore, the upper bezel 330 may be coupled to the opposite side of the lower bezel 310, and may have a second through-hole 333 formed at a location corresponding to the first through-hole 315.

In detail, the bezel 300 may function to protect and fix the optical fiber 400, and also may function to reflect a portion of the light output from the optical fiber 400.

A side of the lower bezel 310, which corresponds to the one lengthwise end 400*a* of the optical fiber 400, will be referred to one side, and a side of the opposite lengthwise end 400*b* of the optical fiber 400 will be referred to as an opposite side. The one end 400*a* and the opposite end 400*b* of the optical fiber 400 may be fixed to the one side and the opposite side of the lower bezel 310.

The lower bezel 310 may extend along a direction, in which the plurality of optical fibers 400 are arranged, and may include a horizontal part 311 and a vertical part 312. The first through-hole 315 may be formed in the vertical part 312, and the opposite end 400*b* of the optical fiber 400 may be fixed to the vertical part 312 while passing through the first through-hole 315.

The upper bezel 330 may be coupled to the vertical part 312 of the lower bezel 310. The second through-hole 333 may be formed in the upper bezel 330 at a location corresponding to the first through-hole 315. The optical fiber 400 may pass through the first through-hole 315 and the second through-hole 333 in a state, in which the upper bezel 330 and the lower bezel 310 are coupled to each other.

The upper bezel 330 and the lower bezel 310 may be coupled to each other in various schemes. For example, an insertion boss 313 that protrudes in a direction that faces the upper bezel 330 may be formed in the lower bezel 310, and an insertion recess 331 that is recessed such that the insertion boss 313 is inserted thereinto may be formed in the upper bezel 330. After the insertion boss 313 and the insertion recess 331 is assembled while the insertion boss 313 is inserted into the insertion recess 331, the upper bezel 330 and the lower bezel 310 may be coupled to the lamp housing 100.

The tension unit 500 may be provided in the upper bezel 330, may include a rubber material, and may be configured to press the opposite end 400*b* of the optical fiber 400 that passes through the first through-hole 315 and the second through-hole 333 in a downward direction that is a direction that faces the lower bezel 310. In the specification, a direction that faces the upper bezel 330 from the optical fiber 400 with reference to the illustrated drawing is referred to as an upward direction, and a direction that faces the lower bezel 310 from the optical fiber 400 is referred to as a downward direction. Meanwhile, the upward direction and the downward direction may be changed according to an installation location of the lamp 10 for a vehicle.

In detail, the tension unit 500 may be fixed to the upper bezel 330 to press the optical fiber downwards when the upper bezel 330 and the lower bezel 310 are coupled to each other so as to apply a tension to the optical fiber 400. For example, the tension unit 500 may be integrally formed with the upper bezel 330 through injection-molding.

Furthermore, the tension unit 500 may be formed of an elastic material such as a rubber material. As an example, the tension unit 500 may be formed of isobutylene-isoprene rubber (IIR), ethylene propylene diene monomer (EPDM), silicone rubber, and the like. Because the rubber material has a strong heat-resistant property, deformation there may be minimized even in a high-temperature environment of the vehicle. However, the material of the tension unit 500 is not limited to the above description.

In this way, because the tension unit 500 elastically presses the optical fiber 400 to provide a tension when the optical fiber 400 is fixed, a pressing degree of the tension unit 500 may be changed according to an elastic restoring force of the tension unit 500 and a deformation degree of the optical fiber 400, and thus the tension of the optical fiber 400 may be maintained.

In more detail, the tension unit 500 may include a fixed portion 510 and a pressing portion 530.

The fixed portion 510 may be fixed to the upper bezel 330. Furthermore, the pressing portion 530 may extend downwards from the fixed portion 510 to press the optical fiber 400.

For example, the pressing portion 530 may be formed to be inclined to become farther from the upper bezel 330 as it goes downwards. That is, the pressing portion 530 may be formed to be inclined while defining a specific angle with the fixed portion 510. A degree, by which the optical fiber 400 is pressed by the tension unit 500, may be determined in a design stage of the lamp 10 according to the angle defined by the fixed portion 510 and the pressing portion 530 and a length "L", by which the pressing portion 530 extends from the fixed portion 510.

For example, the angle defined by the fixed portion 510 and the pressing portion 530 may be 90 degrees to 160 degrees, and the length "L", by which the pressing portion 530 extends from the fixed portion 510, may be 1 mm to 2 mm. However, the shapes of the fixed portion 510 and the pressing portion 530 are not limited thereto, and may be changed according to a design specification and an installation environment.

Meanwhile, as described above, the optical fiber 400 may be fixed to the one side and the opposite side of the bezel 300. The present disclosure may further include a first fixing part 610 and a second fixing part 620.

The first fixing part 610 may be coupled to the one side of the lower bezel 310, and may be configured such that the one end 400a of the optical fiber 400 is fixed to the one side of the lower bezel 310.

For example, the first fixing part 610 may be formed long along a direction, in which the plurality of optical fibers 400 are arranged to hold or fix the ends 400a of the plurality of optical fibers 400 at the same time. The first fixing part 610 may be fixed to the one side of the lower bezel 310 through hooking, bolting, or the like, and the one end 400a of the optical fiber 400 may be fixed while being interposed between the first fixing part 610 and the lower bezel 310. However, the shape and the kind of the first fixing part 610 are not limited to the above-described ones.

The second fixing part 620 may be coupled to the opposite side of the lower bezel 310, and may be configured such that the opposite end 400b of the optical fiber 400 is fixed to the opposite side of the lower bezel 310. Here, the tension unit 500 may be configured to press the optical fiber 400 at a location between a location, at which the optical fiber 400 is fixed by the second fixing part 620, and the bezel 300.

FIGS. 8 to 10 illustrate a first embodiment of the second fixing part 620, and FIG. 11 illustrates a second embodiment of the second fixing part 620.

Referring to FIGS. 8 to 10, the second fixing part 620 according to the first embodiment may include a fixed bracket 630 and an insertion member 640.

The fixed bracket 630 may be fixed to the lower bezel 310, and may be configured such that the opposite end 400b of the optical fiber 400 passes therethrough. Furthermore, the insertion member 640 may be coupled to the fixed bracket 630 to hold or fix the opposite end 400b of the optical fiber 400. The insertion member 640 may be coupled to the fixed bracket 630 to fix the optical fiber 400 while the optical fiber 400 is inserted through the fixed bracket 630.

In detail, the fixed bracket 630 of the second fixing part 620 may be integrally formed with the vertical part 312 of the lower bezel 310. When it is assumed that, among opposite surfaces of the vertical part 312, a surface in an opposite surface to a direction that faces one side of the bezel 300 is a fixed surface, the fixed bracket 630 may be fixed to the fixed surface of the vertical part 312.

The insertion member 640 may be coupled to the fixed bracket 630, and a coupling scheme thereof is not limited. The opposite end 400b of the optical fiber 400 may be interposed between the insertion member 640 and the fixed bracket 630 after passing through the bezel 300, and may be fixed to the second fixing part 620 through coupling of the insertion member 640 and the fixed bracket 630.

The fixed bracket 630 may include a support body 631, a first fixing boss 632, and a second fixing boss 634.

The support body 631 may be fixed to the lower bezel 310. In detail, the support body 631 may extend perpendicularly to the fixed surface of the vertical part 312.

The first fixing boss 632 may protrude from the support body 631 in an upward direction that is a direction that faces the upper bezel 330, and a first fixing recess 633, through which the optical fiber 400 passes, may be formed therein. Furthermore, the second fixing boss 634 may protrude upwards from the support body 631 and may be spaced apart from the first fixing boss 632, and a second fixing recess 635, through which the optical fiber 400 passes, may be formed therein.

An insertion space 636, into which the insertion member 640 is inserted, may be formed in the fixed bracket 630, between the first fixing boss 632 and the second fixing boss 634.

In detail, a space defined by the first fixing boss 632, the second fixing boss 634, and the support body 631 may be referred to as the insertion space 636, and the optical fiber 400 may be press-fitted and fixed in the insertion space 636 by the insertion member 640. Then, the optical fiber 400 may be pressed by the tension unit 500, in the space between the vertical part 312 of the lower bezel 310 and the first fixing boss 632. That is, the optical fiber 400 may be pressed by the pressing portion 530 in a state, in which opposite ends thereof are supported by the first through-hole 315 and the first fixing recess 633, and thus a tension may be applied.

The insertion member 640 may include an insertion bracket 641 and a first insertion block 642.

The insertion bracket 641 may be hook-coupled to the fixed bracket 630. In detail, the insertion bracket 641 may include a hook 641a to be hook-coupled to the support body 631 of the fixed bracket 630. Although the illustrated embodiment illustrates an example of connecting the adjacent insertion brackets 641, they may have shapes that are separated and provided independently.

The first insertion block 642 may be coupled to the insertion bracket 641, and may press and fix the optical fiber 400 located in the insertion space 636 when the insertion bracket 641 and the fixed bracket 630 are coupled to each other. That is, the first insertion block 642 may be inserted into the insertion space 636, and may be coupled to the insertion bracket 641 to contact the support body 631. Accordingly, the optical fiber 400 may be fixed by pressing the optical fiber 400 toward the support body 631 during coupled to the fixed bracket 630.

Here, the first insertion block 642 may include a rubber material. For example, the first insertion block 642 may be formed of isobutylene-isoprene rubber (IIR), ethylene propylene diene monomer (EPDM), silicone rubber, and the like. Because the rubber material has a strong heat-resistant property, deformation there may be minimized even in a high-temperature environment of the vehicle. However, the material of the first insertion block 642 is not limited to the above description.

Meanwhile, referring to FIG. 11, the second embodiment of the second fixing part 620 is different from the first embodiment in the insertion member 640. Accordingly, the second embodiment of the second fixing part 620 may include all the above-described configurations of the first embodiment, except for the above-described differences, and a repeated description of the same configurations will be omitted hereinafter.

According to the second embodiment of the second fixing part 620, the insertion member 640 may include a second insertion block 643. The second insertion block 643 may be coupled between the first fixing boss 632 and the second fixing boss 634 through interference-fitting, and may elastically press and fix the optical fiber 400 located in the insertion space 636.

Furthermore, the second insertion block 643 may include a rubber material. Like the above-described first insertion block 642, the second insertion block 643 may be formed of isobutylene-isoprene rubber (IIR), ethylene propylene diene monomer (EPDM), silicone rubber, and the like. However, the material of the second insertion block 643 is not limited to the above description.

In detail, a magnitude of a direction that faces the second fixing boss 634 from the first fixing boss 632 of the second insertion block 643 may correspond to or be larger than an interval between the first fixing boss 632 and the second fixing boss 634. Because the second insertion block 643 is formed of an elastic rubber material, it may be inserted between the first fixing boss 632 and the second fixing boss 634 even when its size is larger than a size of the insertion space 636. Accordingly, the second insertion block 643 may be inserted between the first fixing boss 632 and the second fixing boss 634 and be coupled thereto through interference-fitting. When the second insertion block 643 is coupled to the insertion space 636 through interference-fitting, the optical fiber 400 may be fixed by pressing the optical fiber 400 toward the support body 631.

Meanwhile, a vehicle according to the present disclosure may include the lamp 10 for a vehicle.

The lamp 10 for a vehicle may include the lamp housing 100, the light source unit200 coupled to the lamp housing 100 and that irradiates light, the bezel 300 coupled to the lamp housing 100, the optical fiber 400 fixed to the bezel 300, connected to the light source unit200, and that outputs the light irradiated from the light source unit 200, and the tension unit 500 provided in the bezel 300, and that applies a tension to the optical fiber 400 in a state, in which the optical fiber 400 is fixed to the bezel 300.

For example, the lamp 10 for a vehicle may be a rear lamp, but the present disclosure is not limited thereto, and may be applied to various lamps such as a headlamp, a turn signal lamp, a tail lamp, a brake lamp, and the like.

When the lamp for a vehicle according to the embodiment of the present disclosure as descried above is used, the optical fiber may be fixed while being tensioned by using the tension unit when the side light emitting optical fiber is installed.

Accordingly, according to the present disclosure, prolongation of the optical fiber due to assembling or vibration of the vehicle may be minimized even when the side light emitting optical fiber is applied, and accordingly, a product value of the lamp for a vehicle may be enhanced.

Although the specific embodiments of the present disclosure have been described until now, the spirit and scope of the present disclosure are not limited to the specific embodiments, and may be variously corrected and modified by an ordinary person in the art, to which the present disclosure pertains, without changing the essence of the present disclosure claimed in the claims.

What is claimed is:

1. A lamp for a vehicle, comprising:
a lamp housing;
a light source unit housed at the lamp housing and configured to irradiate light;
a bezel housed at the lamp housing;
an optical fiber connected to the light source, coupled to the bezel and configured to receive and transmit the light irradiated from the light source unit; and
a tension unit coupled to the bezel and configured to apply a tension to the optical fiber.

2. The lamp of claim 1, wherein:
the bezel has first and second side portions, and
the optical fiber has first and second ends respectively coupled to the first and second side portions of the bezel and extends between the first and second side portions of the bezel.

3. The lamp of claim 1, wherein:
the optical fiber has a first end connected to and receiving the light irradiated from the light source unit, and
at least a portion of the light received at the first end of the optical fiber is output via a side surface of the optical fiber.

4. The lamp of claim 2, wherein the bezel includes:
a lower bezel having a first through-hole at the second side portion of the lower bezel; and
an upper bezel coupled to the second side portion of the lower bezel and having a second through-hole positioned corresponding to the first through-hole.

5. The lamp of claim 4, wherein:
the second end of the optical fiber extends through the first and second through-holes, and
the tension unit is positioned at the upper bezel, includes an elastic material, and is configured to press the second end of the optical fiber downwardly.

6. The lamp of claim 5, wherein the tension unit includes:
a fixed portion coupled to the upper bezel; and
a pressing portion extending downwardly from the fixed portion and configured to press the optical fiber downwardly.

7. The lamp of claim 6, wherein the pressing portion has a portion inclined downwardly.

8. The lamp of claim 4, further comprising:
a first fixing part coupled to a first side portion of the lower bezel, and configured to hold the first end of the optical fiber; and
a second fixing part coupled to a second side portion of the lower bezel, and configured to hold the second end,
wherein the tension unit is configured to press a portion of the optical fiber extending between the second fixing part the bezel.

9. The lamp of claim 8, wherein the second fixing part includes:
- a fixed bracket coupled to the lower bezel wherein the second end of the optical fiber extends through the fixed bracket; and
- an insertion member coupled to the fixed bracket,
- wherein the insertion member and the fixed bracket coupled to each other are configured to hold the second end of the optical fiber.

10. The lamp of claim 9, wherein the fixed bracket includes:
- a support body fixed to the lower bezel;
- a first fixing boss protruding upwardly from the support body and having a first fixing recess; and
- a second fixing boss protruding upwards from the support body, spaced apart from the first fixing boss, and having a second fixing recess,
- wherein the optical fiber extends through the first and second fixing recesses.

11. The lamp of claim 10, wherein:
- the fixed bracket has an insertion space between the first fixing boss and the second fixing boss,
- the insertion member is positioned at the insertion space of the fixed bracket, and
- wherein the insertion member includes:
  - an insertion bracket hook coupled to the fixed bracket; and
  - an insertion block coupled to the insertion bracket, and configured to press a portion of the optical fiber positioned at the insertion space.

12. The lamp of claim 11, wherein the first insertion block includes a rubber material.

13. The lamp of claim 10, wherein:
- the fixed bracket has an insertion space between the first fixing boss and the second fixing boss,
- the insertion member is positioned at the insertion space of the fixed bracket, and
- the insertion member includes an insertion block coupled between the first fixing boss and the second fixing boss, and is configured to elastically press a portion of the optical fiber positioned at the insertion space.

14. The lamp of claim 13, wherein the second insertion block includes a rubber material.

15. A vehicle including the lamp of claim 1.

* * * * *